Dec. 13, 1966   M. V. BRAINE ET AL   3,292,082
SPEED MONITORING APPARATUS USING A SATURATED
MAGNETIC RECORDING TRACK

Filed April 27, 1962   3 Sheets-Sheet 2

Michael V. Braine
William J. Holt
INVENTORS

BY
ATTORNEYS

Dec. 13, 1966 M. V. BRAINE ET AL 3,292,082
SPEED MONITORING APPARATUS USING A SATURATED
MAGNETIC RECORDING TRACK
Filed April 27, 1962 3 Sheets-Sheet 3

Michael V. Braine
William J. Holt
INVENTORS

BY Hastings Ackley
and
Walter J. Jagn

ATTORNEYS

United States Patent Office

3,292,082
Patented Dec. 13, 1966

3,292,082
SPEED MONITORING APPARATUS USING A SATURATED MAGNETIC RECORDING TRACK
Michael V. Braine, Malibu, and William J. Holt, Pacific Palisades, Calif.; said Holt assignor to Varo Inc. Electrokinetics Division
Filed Apr. 27, 1962, Ser. No. 190,651
5 Claims. (Cl. 324—70)

This invention relates to speed monitoring apparatus and to speed controlling systems employing speed monitoring apparatus.

An object of this invention is to provide a new and improved monitoring apparatus for detecting the deviation of the speed of a movable member from a predetermined speed.

Another object is to provide a monitoring apparatus for indicating the deviations in the speed of rotation of a rotatable member from a predetermined speed of rotation.

Still another object is to provide a monitoring apparatus which is capable of indicating very small deviations in the speed of rotation of a rotatable member which continue over more than one rotation of the rotating member.

A further object is to provide a monitoring apparatus for indicating the deviations in the speed of rotation of a rotatable member which occur over very short periods of time which may be less than the period of time necessary for a single rotation of the rotatable member and wherein the average deviation in such single rotation may be zero.

A further object is to provide a monitoring apparatus for indicating the location about the axis of rotation of a rotatable member of cyclic deviations in the speed of rotation of the rotatable member which are of a duration shorter than the time required for a complete rotation of the rotatable member.

A still further object is to provide a monitoring apparatus which produces a direct current which varies in accordance with the deviation in speed of a rotatable member from the predetermined speed of rotation.

Another object is to provide a monitoring apparatus having an indicator means for indicating the variations in the direct current.

Another object is to provide a monitoring apparatus having a control track rotatable with the rotatable member, a recording means for recording a signal of predetermined frequency on the track, a pick-up means associated with the control track for producing a signal which varies in accordance with the speed of rotation of the rotatable member, and means for comparing the predetermined frequency and the signal produced by the pick-up means to produce a direct current which varies in accordance with the deviations in speed of the rotatable member.

Still another object of the invention is to provide a monitoring apparatus wherein the recording means is energized with a frequency of square wave form of such amplitude that no means are required for erasing the signal recorded on the track since the new record being recorded on the control track erases the old record.

A further object of the invention is to provide a monitoring apparatus wherein the recording means and the pick-up means do not have to be separated a distance equal to an integral number of wave lengths of the predetermined frequency.

A still further object of the invention is to provide a speed control system for a rotatable member or shaft having a drive means for causing rotation thereof wherein the signal derived from the monitoring apparatus is employed to control the energization of the drive means to hold substantially constant the speed of rotation of the drive shaft.

Additional objects and advantages of the invention will be readily apparent from the reading of the following description of a device constructed in accordance with the invention, and reference to the accompanying drawings thereof, wherein.

Figure 1:
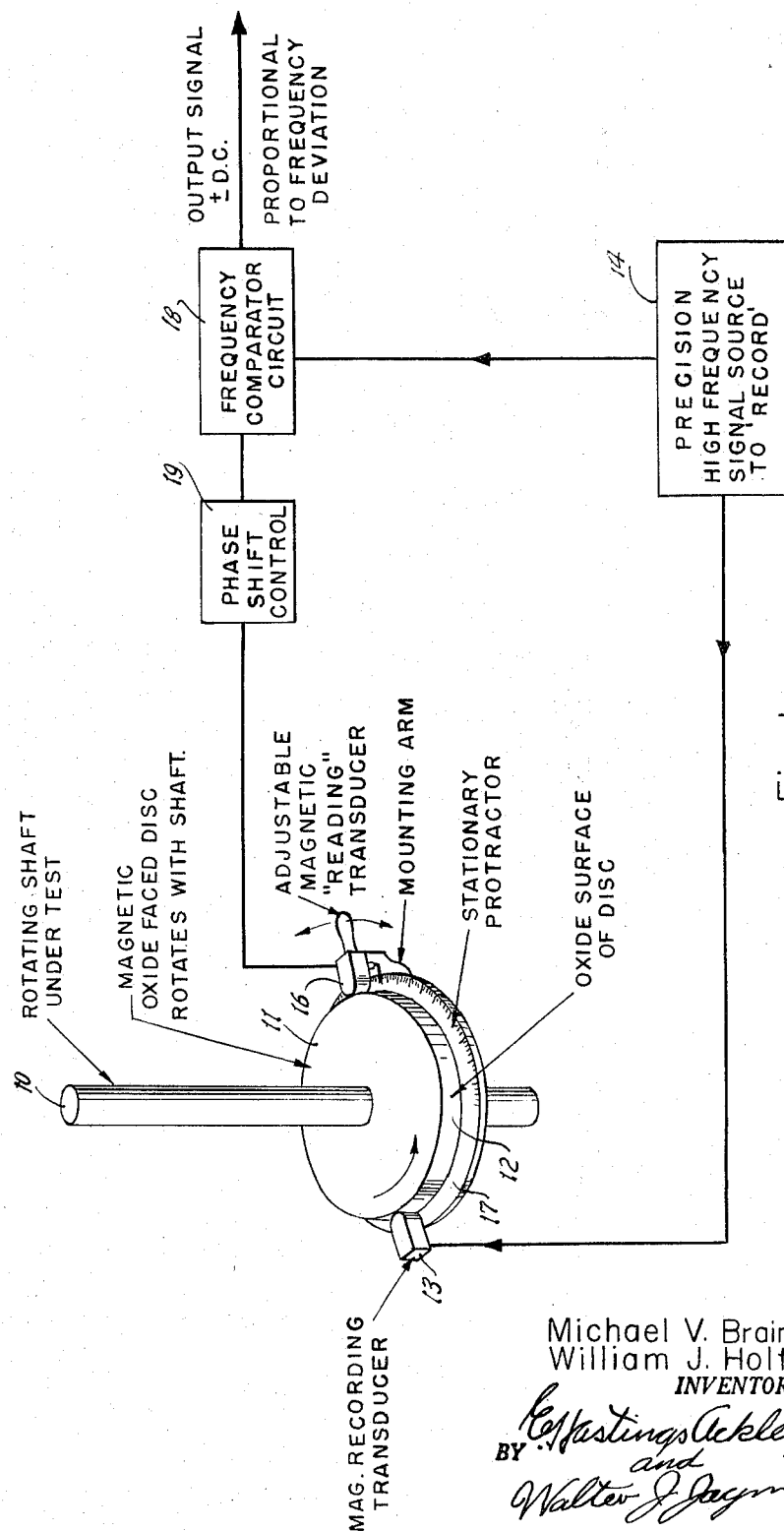
FIGURE 1 is a schematic diagram showing a speed monitoring apparatus embodying the invention.
Figure 2:
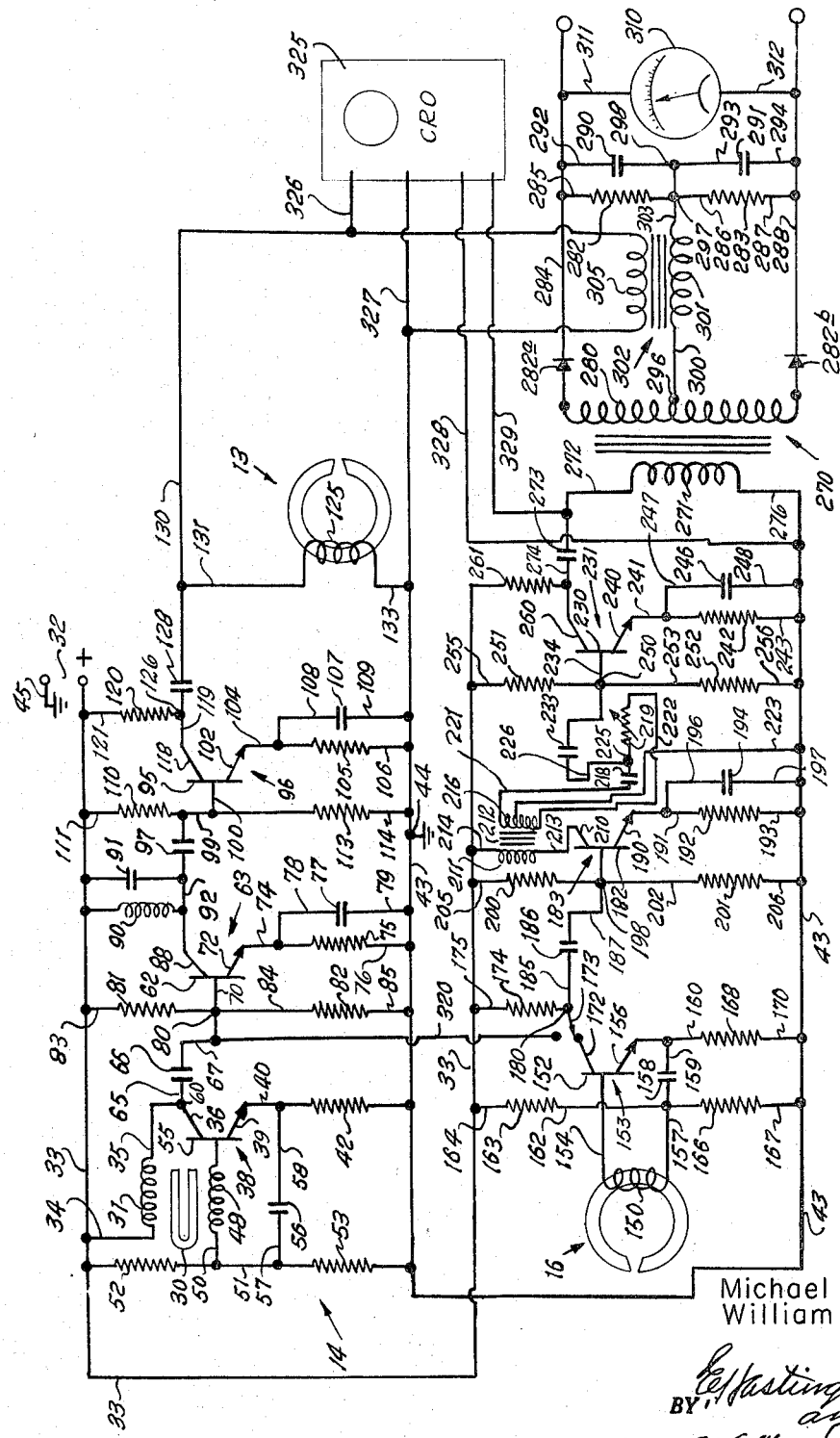
FIGURE 2 is a diagrammatic illustration of the circuit of the speed monitoring apparatus illustrated in FIGURE 1.
Figure 3:
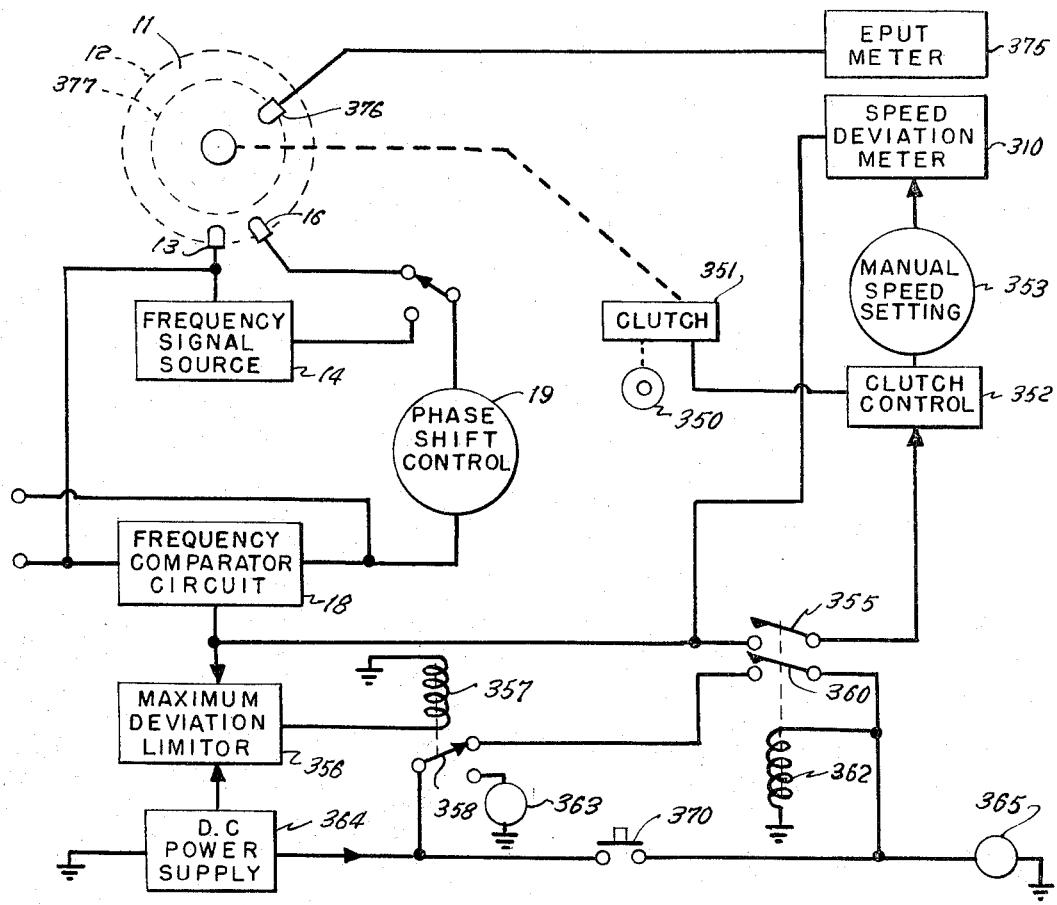
Figure 4:
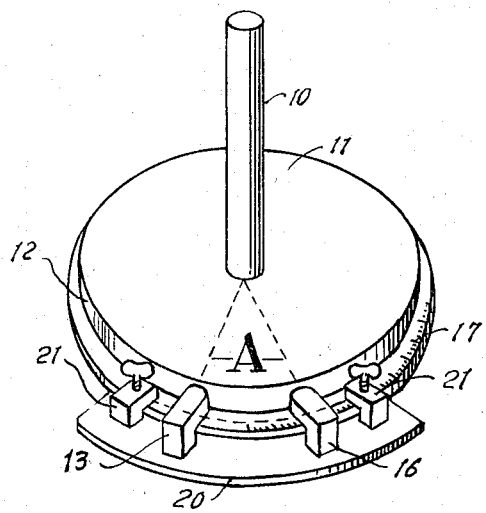

FIGURE 3 is a schematic illustration of a modified form of the monitoring apparatus illustrated in FIGURE 1 whose recording means and pick-up means are mounted a predetermined distance from one another and are movable simultaneously to predetermined positions about the rotatable shaft which may be used to locate and indicate cyclic variations in the speed of rotation of the rotatable shaft; and, FIGURE 4 is a schematic diagram showing a speed control system for a rotatable shaft of a centrifuge employing the speed monitoring apparatus illustrated in FIGURES 1 and 2.

Referring now particularly to FIGURES 1 and 2 of the drawing, the monitoring apparatus for providing a direct current which varies in accordance with the speed of rotation of the shaft 10 includes a disk 11 rigidly secured to the shaft and rotatable therewith. The disk has a coating or control track 12 of a magnetic oxide so that the recording transducer or record head 13 may record a continuous signal on the control track. The recording transducer 13 is energized with an alternate current of square wave form of a precision high frequency generated by a suitable frequency standard or source 14. The square wave alternating current output of the high frequency source causes the recording transducer 13 to continuously record a continuous square wave signal on the control track of such amplitude as to exceed the magnetic saturation of the magnetic oxide of the control track in both polarities so that the old record or recording is erased by the new record as the control track rotates past the recording transducer and it is not necessary to provide a record erase means to erase the old record prior to recording a new record as the disk rotates with the shaft.

The pick-up or reading transducer 16 is positioned adjacent the control track to play back the control signal recorded on the control track and produce a current which varies in accordance with the deviations in the speed of rotation of the disk.

The pick-up head or reading transducer 16 may be secured at any adjusted position about the central axis of the shaft 10 by means of a satisfactory protractor 17 secured in any suitable manner to the supporting structure (not shown). The recording transducer may be secured to the stationary protractor by any suitable releasable clamping or fastening means. The indicia of the stationary protractor indicate the angle or distance between the recording transducer and the reading transducer.

The output of the reading transducer 16 is transmitted to a frequency comparator or phase discriminator circuit 18 through a phase shift control 19 so that the phase of the signal current produced by the reading transducer relative to the phase of the frequency of the current also transmitted to the frequency comparator circuit from the precision high frequency signal source 14 may be varied. The frequency comparator or phase discriminator circuit produces a direct current signal which varies in accordance with the deviation of the speed of rotation of the rotatable shaft from a predetermined speed of rotation. The phase shift control is provided to render unnecessary the spacing of the reading transducer from the recording transducer 13 at an integral number of wave lengths of the signal produced by the precision high frequency source 14. The phase shift control is manually adjustable to cause a zero signal to be produced initially by the frequency comparator circuit, the frequency comparator circuit thereafter producing a direct current which varies in accordance with the deviation or departure of the speed of rotation of the shaft from the speed of rotation at the time the initial setting is made.

It will be apparent that the frequency of the output of the high frequency source and the frequency of the output of the reading transducer 16 will be exactly equal if the rotating shaft rotates at a fixed completely stable speed. If, however, the speed of rotation of the rotating shaft varies, the frequency of the output of the reading transducer 16 will shift or vary and the frequency comparator circuit will produce a direct current signal whose polarity and value will vary in accordance with the direction and degree of deviation of the speed of rotation of the rotating shaft from the predetermined speed of rotation. It will be apparent that the monitoring apparatus will detect the average deviation of the speed of rotation of the rotating shaft over the angle of rotation thereof determined by the spacing between the recording and reading transducers and that if the reading transducer is positioned closely adjacent, say ten degrees, from the recording transducer, the output signal of the frequency comparator circuit will vary in accordance with the average deviation of the speed of rotation from the predetermined speed through the ten degrees, and that if the reading transducer 16 is positioned a greater distance away from the recording transducer, say eighteen degrees, the output signal of the frequency comparator circuit will vary in accordance with the average deviation of the speed of rotation of the rotating shaft through such eighteen degrees.

Should it be desired to measure the cyclic deviations of the rotating shaft from a predetermined speed through particular angles about the central axis of the shaft, the recording transducer 13 and the reading transducer 16 may be mounted on an adjustable support plate 20, FIGURE 4, which may be positioned at any desired position about the periphery of the disk 11 and be secured to the protractor 17 by any suitable means, such as clamps 21. The clamps may abut the upper surface of the protractor, the inner edge of the support plate 20 being positionable below the lower surface of the protractor.

If the speed of the rotating shaft varies cyclically during each complete rotation of the shaft so that the average speed of rotation of the shaft over a full cycle of rotation is constant, such small cyclic speed variations or deviations being commonly referred to as "wow," nodal points of such cyclic speed variations of the rotating shaft may be determined by positioning the assembly of the support plate 20 and the recording and reading transducers 13 and 16 on the protractor at various points about the periphery disk and comparing the phase relationship between the recorded signal as read by the reading transducer and the frequency of the signal source or frequency standard 14.

The distance between the reading and recording transducers on the plate 18 may of course be set at any fixed distance which can be varied by adjustably mounting, in any suitable manner, one of the transducers for movement on the support plate toward or away from the other transducer so that the cyclic variation through any desired predetermined number of degrees may be determined at any position about the axis of rotation of the rotatable shaft.

Referring now particularly to FIGURE 2, the precision high frequency signal source or standard 14 may include a tuning fork 30, or other suitable oscillator, having a very stable natural frequency of vibration. The drive coil 31 of the tuning fork is connected across a direct current input circuit by means of the main conductor 33, which is connected to one side of the input circuit 32, the conductor 34, the conductor 35, the collector 36 of the transistor 38, the emitter 39, the conductor 40, the resistance 42 and the main conductor 43 which is connected to the other side of the input circuit through the conductor 44, ground and the conductor 45. One side of the pick-up coil 48 of the tuning fork is connected to the main conductor 33 through the conductors 50 and 51 and the resistance 52 and and to the other main conductor 43 through the conductors 50 and 51 and the resistance 53. The other side of the pick-up coil is connected to the base 55 of the transistor 38. The capacitor 56 may be connected across the pick-up coil 48 and the base emitter circuit of the transistor 38 by means of the conductors 50, 51, 57, 58 and 40. It will be apparent that when the input circuit 32 is connected to a suitable source of direct current, the tuning fork 30 is set into vibration by the pulses of current flowing through the drive coil 31 and the tuning fork induces an alternating potential in the pickup coil 48 which varies the flow of current in the collector emitter circuit of the transistor 38 to maintain the tuning fork in vibration in a well known manner.

The common connection or junction 60 of the inductance 31 and the collector of the transistor 38 is connected to the base 62 of an amplifying transistor 63 by means of the conductor 65, the blocking capacitor 66, the conductor 67 and the conductor 70. The emitter 72 of the amplifying transmitter 63 is connected to the main conductor 43, and thus across the collector emitter circuit of the transistor 38 and the resistance 42, by means of the conductor 74, the resistance 75, and the conductor 76. A capacitor 77 may be connected across the resistance 75 by the conductors 78, 79, and 43. The base 62 of the amplifying transistor 63 is also connected to the junction or common connection 80 of the serially connected resistances 81 and 82 which are connected in series across the main conductors 33 and 43 by means of the conductors 83, 84 and 85. It will thus be apparent that the variations in the conductivity of the emitter collector circuit of the transistor 38 caused by the vibration of the tuning fork causes variations in the potential at the common connection or junction 60 of the collector 36 and the inductor 31 which is impressed across the base emitter circuit of the amplifying transistor 63 to vary its conductivity in accordance with such variations.

The collector 88 of the amplifying transistor 63 is connected to the main conductor 33 by the inductance 90 and the capacitor 91 which are connected in parallel across the conductors 33 and 92.

The base 95 of a second amplifying transistor 96 is connected to the conductor 92 through the blocking capacitor 97 by the conductors 99 and 100 while its emitter 102 is connected to the main conductor 43 through the conductor 104, biasing resistance 105 and the conductor 106. A capacitor 107 may be connected across the resistance 105 by means of the conductors 108, 109 and 43. The base 95 of the amplifying transistor 96 is also connected to the main conductor 33 by means of the conductors 100 and 99, the resistance 110 and the conductor 111 and to the conductor 43 through the conductors 100, 99, the resistance 113 and the conductor 114. It will thus be apparent that the output of the first amplifying transistor 63 is impressed across the base emitter circuit of the second amplifying transistor 96. The collector 118 of the amplifying transistor is connected to the main conductor 33 through the conductor 119, the current limiting resistance 120 and the conductor 121.

The drive coil 125 of the recording transducer 13 has one end connected to the common junction or connection 126 of the connector 118 and the resistance 120 by means of the conductor 119, the capacitor 128, the conductor 130 and the conductor 131 while its opposite end is connected to the emitter 102 of the transistor 96 through the conductor 133, the conductors 43 and 106, the resistance 105 and the conductor 104. It will thus be apparent that the variations in flow of current in the collector emitter circuit of the transistor 96 will cause an alternating potential of square wave form to be impressed across the drive coil 125 due to the alternate charging and discharging of the capacitor 128 and that such alternating potential of square wave form will be of the same frequency as the frequency of vibration of the tuning fork 30. When an alternating potential of square wave form is impressed across the drive coil 125 of the recording head 13 while the outside surface of the disk 11 is rotating therepast, a signal of square wave form will be impressed on the magnetic oxide or control track 12 which will be of alternately opposite polarities and, since the alternating potential is of sufficiently high potential to cause alternate magnetic saturation of the control track 12, the old signal recorded on the control track will be erased by the recording transducer as the new one is recorded thereon.

The pick-up coil 150 of the reading transducer 16 has one side connected to the base 152 of a transistor 153 by means of the conductor 154 while its other side is connected to the emitter 156 of the transistor by means of the conductor 157, the capacitor 158, and the conductors 159 and 160 so that the alternating potential induced in the pick-up coil by the record on the magnetic oxide control track 12 as the disk rotates past the reading transducer is impressed across the base emitter circuit of the transistor 153.

The base 152 of the transistor is connected to one side of the direct current input circuit 32 through the conductor 154, the pick-up coil 150, the conductor 157, the conductor 162, the resistance 163, the conductor 164 and the main conductor 33. The base 152 is also connected to the other side of the input circuit 32 by means of the conductor 154, pick-up coil 150, the conductors 157 and 162, the resistance 166 and the conductors 167 and 43. The emitter 156 of the transistor 153 is connected to the main conductor 43 through the conductor 160, the resistance 168 and the conductor 170 while the collector 172 of the transistor is connected to the other side of the input circuit through the movable switch 173, the resistance 174 and the conductors 175 and 33.

It will thus be apparent that the conductivity of the collector emitter circuit of the transistor will vary in accordance with the potential impressed across the base emitter circuit thereof and therefore in accordance with the record on the control track 12 of the disk 11.

The common connection or junction 180 of the switch 173 and the resistance 174 is connected to the base 182 of a first amplifying transistor 183 by means of the conductor 185, the blocking capacitor 186 and the conductor 187 while the emitter 190 thereof is connected to the main conductor 43 through the conductor 191, the resistance 192 and the conductor 193. A capacitor 194 is connected across the resistance 192 by means of the conductors 191, 196, 197, 43 and 193.

It will be apparent that the output of the transistor 153 is impressed across the base emitter circuit of the amplifying transistor 183.

The base 182 of the amplifying transistor is also connected to the common connection or junction 198 of the serially connected resistances 200 and 201 by means of the conductor 187 which is connected to the conductor 202 which connects the resistances. The resistance 200 is connected to the main conductor 33 by the conductor 205 while the resistance 201 is connected to the main conductor 43 by the conductor 206.

The collector 210 of the amplifying transistor is connected to one side of the primary winding 211 of a transformer 212 by the conductor 213. The other side of the primary winding is connected to the main conductor 33 by the conductor 214. It will now be apparent that the primary winding is connected in series with the collector emitter circuit of the amplifying transistor 183.

The secondary winding 216 of the transformer has a capacitor 218 and a variable resistance 219 connected in series across its opposite sides by means of the conductors 221 and 222 while the mid-point of the secondary winding is connected to the main conductor 43 by the conductor 223. The common connection or junction 225 of the condenser 218 and the variable resistance 219 is connected to the base 230 of a second amplifying transistor 231 by means of the conductor 226, the blocking capacitor 233 and the conductor 234. It will be apparent that the transformer 212, the capacitor 218 and the variable resistance 219 comprise the phase shift or control circuit 19 for shifting the phase of the output of the first amplifying transistor 183 and that the phase of this output may be shifted by varying the resistance 219. The emitter 240 of the second amplifying transistor 231 is connected to the main conductor 43 through the conductor 241, the resistance 242 and the conductor 243. It will thus be apparent that the output of the phase shift control circuit 19 is impressed across the base emitter circuit of the second amplifying transistor 231.

The capacitor 246 is connected across the resistance 242 by means of the conductors 241, 247, 248, 43 and 243. The base 230 of the second amplifying transistor is also connected by the conductor 234 to the common connection or juncture 250 of the resistances 251 and 252 which are connected in series by the conductor 253. The resistance 251 is connected to the main conductor 33 by the conductor 255 while the resistance 252 is connected to the main conductor 43 by the conductor 256. The collector 260 of the second amplifying transistor is connected to the main conductor 33 through the resistance 261. It will thus be apparent that the conductivity of and the current flow through the collector emitter circuit of the second amplifying transistor will vary in accordance with the output of the phase shift circuit 19.

The frequency comparator or phase discriminator circuit 18 includes a transformer 270 having a primary winding 271, one of whose sides is connected to the main conductor 33 through the conductor 272, the capacitor 273, the conductor 274, and the resistance 261 and whose other side is connected to the main conductor 43 by the conductor 276. The primary winding is connected across the collector emitter circuit of the second amplifying transistor through the resistance 242 so that the output of the second amplifying transistor causes an alternating potential of square wave form to be impressed across the primary winding 271 due to the alternate charging and discharging of the capacitor 273.

The secondary winding 280 of the transformer 270 has a pair of serially connected diodes 282a and 282b and resistances 282 and 283 connected across its opposite sides by means of the conductors 284, 285, 286, 287 and 288. A pair of serially connected capacitors 290 and 291 are also connected in series across the opposite sides of the secondary winding 280 by means of the conductors 284, 292, 293, 294 and 288. The mid tap or midpoint 296 of the secondary winding 280 is connected to the junctures or common connections 297 and 298 of the serially connected resistances and capacitors, respectively, by means of the conductor 300, the secondary winding 301 of the transformer 302 and the conductor 303.

The opposite sides of the primary winding 305 of the transformer 302 are connected to the conductors 130 and 43 and the primary winding 305 is therefore energized with alternating potential by the frequency signal source or frequency standard 14.

A speed deviation meter 310 is also connected across the conductors 284 and 288 by the conductors 311 and 312.

It will be apparent that the frequency comparator or phase discriminator circuit 18 is of the conventional type which compares the phase of the alternating potentials impressed across the primary windings 271 and 305 to produce a direct current signal whose polarity and magnitude vary in accordance with the phase differences of the frequencies of the alternating potentials impressed across the primary windings of the two transformers, the phase discriminator circuit producing zero current or potential when the phase difference between the alternating potentials across the primary windings is zero, so that the meter 310 will then be at its midpoint or zero. The phase discriminator circuit causes current to flow through the meter 310 in one direction when the phase of the frequency of the alternating potential across one of the primary windings shifts in one direction relative to the phase of the alternating potential impressed across the other of the primary windings and causes current to flow in the opposite direction when the phase of the alternating current across such one of the primary windings shifts in the opposite direction relative to the phase of the alternating current in such other of the primary windings.

It will thus be apparent that the circuit illustrated in FIGURE 2 has a precision frequency standard or source 14 which may be of high frequency, such as ten kilocycles per second, whose output is impressed across the drive coil 125 of the recording transducer 13 and also across the primary winding 305 of the transformer 302 of the phase discriminator circuit 18.

It will also be apparent that the circuit includes the pick-up coil 150 of the reading transducer 16 whose output is applied across the primary winding 271 of the transformer 270 of the phase discriminator circuit 18 and that the phase shift circuit or control 19 has a variable resistance 219 which may be adjusted to shift the phase of the output of the pick-up coil 150 of the reading transducer prior to its application across the primary winding 271.

The calibrating switch 173 is provided to disconnect the coil 150 of the reading transducer 16 from the base 182 of the first amplifying transistor 183 and to connect the base emitter circuit of the transistor 183 to the output of the transistor 38 of the frequency signal source or standard 14 through the conductor 320.

When it is desired to calibrate the speed deviation meter 310, one channel of the dual channel oscilloscope 325 is connected across the primary winding 305 through the conductors 326, 43, 130 and 327 so that this channel of the oscilloscope is energized directly from the frequency signal source or standard 14. The other channel of the dual channel oscilloscope is connected across the output of the second amplifying transistor 231 and across the primary winding 271 by means of the conductors 328 and 329 which are connected, respectively, to the conductors 272 and 276, respectively. The screen of the dual channel oscilloscope will thus present visual images of the square wave alternating potentials which are impressed across the primary windings 271 and 305. The variable resistance 219 of the phase shift circuit 19 is then adjusted until the visual images of the wave forms on the screen of the oscilloscope indicate a zero phase shift between the alternating potentials across the primary windings 271 and 305. The meter 310 is then adjusted so that its pointer or needle indicate rests at zero. The variable resistance is then adjusted to cause the alternating potential across the primary winding 271 to shift in one direction until it is 180 degrees out of phase with the alternating potential applied across the primary winding 305 by the frequency standard. The needle of the meter then should be at one extreme end of the scale. The variable resistance 219 is then adjusted to cause the phase of the alternating potential applied across the primary winding 271 to shift in the opposite direction 180 degrees out of phase with the alternating potential applied across the primary winding 305 and the meter should then read full scale in the opposite direction since the direction of flow of the current through the meter is now reversed. When the meter is properly calibrated, the switch 173 is moved back to the position illustrated in FIGURE 2 and the monitoring apparatus is then in condition to monitor the speed of rotation of the rotatable shaft 10.

The recording transducer then records the square wave signal on the control track 12 and the reading transducer 16 reads the signal from the control track. The alternating potential produced by the reading transducer is applied across the primary winding 271 of the frequency comparator or phase discriminator circuit 18 while simultaneously the output of the frequency standard or frequency signal source 14 is applied across the primary winding 305. If the reading transducer is now not located an integral number of wave lengths along the control track 12 from the recording transducer 13, the initial reading of the meter will indicate a phase shift but the variable resistance may be adjusted to compensate for this error introduced by such positioning of the reading transducer and cause the meter to read zero at an initial or starting time of the monitoring of the speed of rotation of the rotatable shaft 10. Should the speed of rotation of the shaft now vary from its speed at the time the initial setting or adjustment will indicate the magnitude and direction of such deviation, that is, whether the speed rotation of the shaft is either increased or decreased and to what degree.

In the event that it is desired to find the location and magnitude of cyclic deviations or changes in the speed of rotation of the shaft which are of very short duration and shorter than the time required for the shaft to rotate to through one complete rotation, the recording transducer and the reading transducer are mounted on the support plate 20 as indicated in FIGURE 4 and the speed deviation meter calibrated as explained above. The support plate is then shifted on the protractor to various positions about the control track 12 of the disk 11. At each selected position of the support plate, and therefore of the transducers, when the support plate 20 has been rigidly secured to the protractor, the output of the phase discriminator circuit 18 will be zero if the average speed deviation of the shaft during its rotation through the angle A of the segment of the control track 12 between the recording and reading transducers is zero. If, however, the average speed deviation of the shaft in either direction in its rotation through the angle A is greater than zero, the shift in phase of the potential applied across the primary winding 271 relative to the alternating potential applied to the primary winding 305 will cause the phase discriminator circuit 18 to produce a direct current signal and the speed deviation meter 310 will indicate the direction and magnitude of the average speed deviation of the shaft during its rotation through such angle A. The support plate may of course then be moved from one position to another about the shaft to determine the locations of the nodal points of such cyclic speed deviations of the shaft which are commonly termed "wow."

Since the recording and reading transducers are rigidly fixed to the support plate 20, and thus a fixed distance apart about the control tracks, it is not necessary to recalibrate the speed deviation meter each time the support and the transducers are moved from one position to another on the protractor.

It will be apparent that the support plate 20 may be provided with a suitable means for moving on the protractor 17, such as the well known vernier type mechanism. The mounting of the reading transducer 16 on the mounting plate 20 may be also by means of a vernier type mechanism so that it may be moved relative to the recording transducer in order to permit the determination of the cyclic speed deviations of the rotation of the shaft through different angles of rotation of the shaft.

The monitoring apparatus shown in FIGURES 1, 2 and 4 may be utilized in the speed control system illustrated in FIGURE 3 which controls the speed of rotation of the shaft 10 of a centrifuge. The shaft 10 is connected to an electric drive motor 350 by means of the eddy current clutch 351 having the usual control 352. The output circuit 18 of the phase discriminator is connected to an eddy current clutch control 352 through the relay contact 355 and to a maximum deviation limiter 356 which controls the energization of the relay winding 357. The relay winding 357 controls the position of the relay contact 358. When in the upper position illustrated in FIGURE 3, the relay contact 358 is connected in series with the relay contact 360. The relay contacts 355 and 360 are held in their lower closed positions when the relay coil 362 is energized. The relay contact 358 when in a lower position connects a visual signal lamp 363 across the power supply 364.

A servo "on" visual signal, such as the green lamp 365, is also connected across the direct current power supply 364 when the relay winding 362 is energized and the relay contact 358 is in the position illustrated in FIGURE 3. The relay winding 362 is also connectible across the D.C. power supply 364 by the servo control reset switch 370, which may be of the push button type, so that a momentary actuation of the switch 370 will energize the relay winding 362 and move the relay contacts 355 and 360 to other closed positions, the relay winding 362 remaining in its energized position once the contact 360 has moved to its closed position, even when the switch 370 moves to its open position provided that the maximum deviation limiter energizes the relay winding 357 to move the relay contact 358 to its lower position whenever the speed deviation of the shaft 10 exceeds a predetermined value in either direction. When this occurs the relay winding 362 is of course de-energized as is the servo "on" signal 365 and the relay contact 355 moves to its upper open position so that the speed monitoring apparatus no longer will control the clutch control and thus the speed of rotation of the centrifuge shaft 10.

An EPUT meter 375 is provided for use in setting the speed of rotation of the shaft at any desired predetermined value, such as 30 r.p.m. or 300 r.p.m. The EPUT meter is connected to a reading transducer 376 which is associated with a control track 377 on which may be recorded a fixed number of pulses, such as 6000 pulses so that the EPUT meter will read out 6000 pulses for each revolution of the shaft.

In use, the desired speed of rotation whether 30 r.p.m., 300 r.p.m. or any other desired value, is first set by the employment of the manual speed setting device 353 associated with the eddy current clutch control, the EPUT meter now being employed to set the speed at the desired value. The manual phase shift control 19 is then employed to calibrate the speed deviation meter to zero, the servo control reset switch 370 is momentarily closed and the relay winding 362 is energized to move the relay contacts 355 and 360 to their closed positions. The relay contact 358 is now in its upper position illustrated in FIGURE 3 if the speed deviation of the shaft from the desired speed does not exceed a certain value. As a result, the clutch control is now connected to the phase discriminator. The signal from the phase discriminator now controls the operation of the clutch control to hold the speed of rotation of the centrifuge shaft substantially constant. Should the speed of rotation of the shaft deviate from the predetermined speed in excess of a predetermined value, the relay winding 357 is energized to move the relay contact 358 to its lower position. The visual signal 363 is then energized to indicate that the speed deviation has moved out of limits and simultaneously the contact 355 moves upwardly to its open position since the relay winding 362 is now de-energized. As a result the eddy current clutch control must now be manually controlled and the servo "on" signal is now de-energized.

Should this occur, the manual speed setting device 353 must then be again employed to bring the speed of rotation of the shaft 10 back to approximately the predetermined speed of rotation and the servo control reset switch again momentarily closed to again place the speed control system under control of the speed monitoring apparatus.

The manual speed setting device 353 may be connected in any suitable manner to the speed deviation meter to provide a scale factor feed back since it will be apparent that to obtain a full deflection of the speed deviation meter at different speeds of rotation, the scale factor of the meter must be increased or decreased proportionately.

It will now be seen that a new and improved speed monitoring apparatus has been illustrated and described which may be used to indicate the deviations in the speed of rotation of a movable member, such as the shaft 10.

It will further be seen that the monitoring apparatus produces a direct current signal which may be employed in a speed control system to control the speed of movement of the movable member.

It will further be seen that the speed monitoring system continuously monitors the speed of rotation of a rotatable shaft and that the monitoring apparatus will indicate even short term deviations in the speed of rotation of the shaft.

It will further be seen that the monitoring system includes a magnetic control track which rotates with the shaft, a recording transducer energized by a high precision frequency standard or source to record continuously a square wave form signal on the magnetic control track, a reading transducer spaced from the recording transducer for reading the square wave signal of the control track and producing an alternating potential, and a frequency comparator or phase discriminator circuit which compares the phases of the frequency of the alternating potential of the frequency standard and of the output of the reading transducer to produce a direct current signal which varies in accordance with the deviations in speed of the shaft during its rotation through the angle between the recording transducer and the reading transducer, it being apparent that the length of each recorded square wave will increase as the speed of rotation of the shaft increases and will decrease as the speed of rotation of the shaft decreases thus causing a shift in the phase relationship between the recorded signal which is read by the reading transducer and the signal or frequency produced by the frequency standard or source.

It will further be seen that a manual phase shift control for shifting the phase of the output of the reading transducer prior to its application to the phase discriminator circuit has been provided whereby the recording and reading transducers do not have to be positioned an integral number of wave lengths from one another along the control track.

It will further be seen that the manual phase shift control or circuit may also be used to calibrate the speed deviation meter energized by the output of the phase discriminator circuit.

It will further be seen that when the recording and reading transducers are mounted a fixed distance relative to one another and movably about the control track, as by means of the support plate 20, the speed monitoring device may be employed to indicate the locations of cyclic speed deviations of the shaft about the central axis thereof.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A monitoring apparatus for producing a signal which varies in accordance with the deviations and the speed of a movable member comprising: a control track movable with the movable member; a recording transducer disposed along said track; frequency standard means connected to said recording transducer for energizing the recording transducer with a signal having a constant frequency whereby said recording transducer continuously records a signal on said track while said movable member is moving; a reading transducer spaced from said recording transducer along the control track in the direction of movement of said control track for reading the recorded signal; frequency comparator means coupled to said frequency standard means and to said reading transducer for comparing the phase relationships of said constant frequency and the output of said reading transducer and producing a control signal which varies in accordance with the deviations in the speed of said movable member; and means operatively associated with said reading transducer for varying the phase relationship of the output of said reading transducer relative to said constant frequency before said output of said reading transducer is applied to said last mentioned means, said control track comprising a magnetic record means and said recording transducer magnetically saturating said magnetic recording means alternately in opposite magnetic polarities in accordance with said constant frequency whereby a new signal recorded on said magnetic record means erases the old record previously recorded by said recording transducer.

2. The monitoring apparatus of claim 1, and mounting means for said reading transducer and said recording transducer for holding said transducers in fixed spaced relationship to one another along said control track and for movement along said control track.

3. The monitoring apparatus of claim 2, and indicator means energized by said frequency comparator means for indicating the deviations in the speed of the movable member.

4. The monitoring apparatus of claim 3, and means connectable to said frequency comparator means and said means for varying the phase relationship for calibrating said indicator means.

5. A monitoring apparatus for producing a signal which varies in accordance with the deviations in speed of rotation of a rotatable shaft comprising: a control track rotatable with said shaft; a recording transducer disposed along said track; frequency standard means connected to said recording transducer for energizing the recording transducer with an alternating potential having a constant frequency whereby said recording transducer continuously records a signal on said control track while said shaft is rotating; a reading transducer spaced from said recording transducer along the control track in the direction of rotation of said control track for reading the recorded signal and producing a potential whose frequency varies in accordance with the speed of rotation of said control track; frequency comparator means coupled to said frequency standard means and to said reading transducer for comparing the phase relationships of said alternating potential of constant frequency and said alternating potential produced by said reading transducer to produce a direct current signal which varies in accordance with the deviations in the speed of rotation of said shaft; means operatively associated with said reading transducer for varying the phase relationship of said alternating potential produced by said reading transducer relative to said alternating potential of constant frequency before said output of said reading transducer is applied to said last mentioned means, and mounting means for said reading transducer and said recording transducer for holding said transducers in fixed spaced relationship to one another and for simultaneous movement about said control track and about the axis of rotation of said rotatable shaft, said control track comprising a magnetic record means and said recording transducer magnetically saturating said magnetic recording means alternately in opposite magnetic polarities in accordance with said alternating potential of constant frequency whereby a new signal recorded on said magnetic record means erases the old signal previously recorded by said recording transducer as said shaft rotates.

References Cited by the Examiner
UNITED STATES PATENTS

| | | | |
|---|---|---|---|
| 1,861,180 | 5/1932 | Grob | 192—104 |
| 2,786,978 | 3/1957 | Warner | 324—70 |
| 2,870,407 | 1/1959 | Baker | 324—101 |
| 2,918,581 | 12/1959 | Willey et al. | 250—83.3 |
| 2,970,262 | 1/1961 | Haase | 324—82 |
| 2,988,695 | 6/1961 | Leavitt | 324—82 |
| 3,084,307 | 4/1963 | Landis | 324—70 |
| 3,089,029 | 5/1963 | Brinker | 324—70 |
| 3,089,061 | 5/1963 | Nieuweboer | 324—70 |

WALTER L. CARLSON, *Primary Examiner.*

FREDERICK M. STRADER, *Examiner.*

C. W. HOFFMANN, M. J. LYNCH,
*Assistant Examiners.*